United States Patent Office 3,320,693
Patented May 23, 1967

3,320,693
METHOD OF INDUSTRIAL CULTIVATION OF UNICELLULAR GREEN ALGAE SUCH AS CHLORELLA
Minoru Shirota, Kyoto, Hiroshi Endo, Hirakata, Osaka, and Kei Nakajima, Kyoto, Japan, assignors to Kabushiki Kaisha, Yakult Honsha, Tokyo, Japan
No Drawing. Filed Aug. 16, 1965, Ser. No. 480,157
Claims priority, application Japan, Sept. 11, 1964, 39/51,387
1 Claim. (Cl. 47—1.4)

This invention relates to the heterotrophic culture of unicellular green algae such as Chlorella, Scenedesmus and the like (indicated as Chlorella and the like hereinafter) which are regarded as important sources for foods, feeds, drugs, chlorophyll, growth promoting factor for lactobacilli, physiologically active factors, and the like, and proposes a consistent method for industrial mass culture based on the selection of strains.

Chlorella and the like are known as an autotrophic organism which grow using the energy of light in the presence of inorganic salts, water, and carbon dioxide, namely dependent on photosynthesis, and in the part, an open circulation pond-cultivation method has been generally used for the mass culture of them.

But as this method is largely dependent on light and gives extremely low yields, it is not practical because of many faults for the industrial production. On the contrary, although a phenomenon that Chlorella and the like effect so-called heterotrophic growth in the dark in the presence of organic matter, has been well known, the growth yield is very little and the large scale culture of Chlorella by this method has not been conceivable.

The inventors have been engaged in the study of the heterotrophic cultivation of Chlorella and the like and gained a knowledge that its mass production by way of tank culture may be possible, if strains of Chlorella and the like capable of actively growing independently of light are selected and the suitable conditions for cultivation are found. By this way, protein, vitamin and others, valuable in view of nutrition but poor in source, can be produced very efficiently and cheaply, utilizing carbohydrates such as sugars, which are remarkably abundant in resources, as the energy source.

Thus the inventors, as the result of the study, succeeded in isolating a strain showing a high rate of growth without light and in effecting high yield by cultivating Chlorella and the like under an aerobic condition and adding sugars or organic acids together with cystine, cysteine, methionine, serine, glycine, lysine and tryptophane or natural matters containing these amino acids to the conventional medium of inorganic salts, without purposely introducing carbon dioxide. Moreover, heterotrophic culture of this strain under a proper condition can produce Chlorella and the like in so high yields as incomparable to the past pond-cultivation, which leads to the present invention.

The embodiment of the present invention will be explained in detail hereinafter.

(1) *Method for selective isolation of strains.*—A liquid medium containing sugars or organic acids as the carbon source, nitrates, ammonia, ammonium salts and urea as the nitrogen source, phosphorus, potassium, sulfur, magnesium, manganese, iron, boron, zinc, molybdenum, cobalt and copper as the inorganic salts, and more than one of amino acids such as cystine, cysteine, methionine, serine, glycine, lysine and tryptophane or natural matters containing these amino acids, is taken in a flask with a cotton-stopper, which then is sterilized by heating.

This medium in the flask is inoculated with many strains of Chlorella and the like respectively which have been previously purely isolated from rivers, ponds, rice fields, drains and the like in a conventional way and have been cultured autotrophically on inorganic salts agar media, and cultivated with shaking at 20° C.~30° C. in the dark. After several days, the strains of remarkable growth selected, and a similar procedure is repeated several times with the strains selected as above, and thus a strain, of rapid growth and largest multiplication, is finally selected. Above procedure is not limited to the case of a liquid media but also applied to the standing culture which was inoculated on the plate agar media having a similar composition. In this case, a colony showing good growth is picked up and similar isolation repeated.

Addition of amino acids enables one to obtain strains growing heterotrophically in an extremely short time. Amino acids to be used in this case may be natural materials such as soy beans, yeast, fish meals, meat extract, milk, casein, waste from fermented milk, wheat bran and extracts from rice bran.

The relation between the addition of amino acids and the rate of growth is shown in Table 1.

TABLE 1.—EFFECT OF AMINO ACIDS UPON GROWTH (CHANGE IN THE AMOUNT OF GROWTH WITH ELAPSE OF DAYS)

| Media | Time in days | | | | | Rate of growth per day |
|---|---|---|---|---|---|---|
| | 2 | 4 | 6 | 8 | 14 | |
| Inorganic salts medium added with glucose | 0.022 | 0.028 | 0.04 | 0.056 | 0.24 | 0.17 |
| Inorganic salts medium added with amino acids and glucose | 0.034 | 0.26 | 2.4 | 5.8 | 6.4 | 1.34 |

NOTE: The numerals in the table indicate the amount of dried Chlorella (g./l.).

As evident from this Table 1, the addition of amino acids accelerates growth more rapidly than the case without addition, which permits the markedly efficient selection of strains growing by heterotrophy. Moreover, when heterotrophic grown strains are isolated by using inorganic salts media added with glucose but without amino acid, the growth becomes weak after the second generation cultivated in the dark, and at last a majority of strains is extinguished. However, successive culture is made possible by adding amino acids, and hence the addition of amino acids is thought to have an important effect in industrial cultivation on a large scale.

Moreover addition of amino acids to the medium serves for improving the rate of utilization of ingredients in the medium, and therefore by raising the concentration of sugars and nitrogen in the medium, the growth is effected vigorously in the dark, the maximum multiplication of which reaches as high as 20~30 g./l. In this case, the ratio of content of carbon source to that of nitrogen source (C/N ratio) in the medium should be kept under 6, so that the content of protein in the cells of algae may be made as such as more than 50%.

The strain thus isolated grows in the dark, needs no light, yields a large rate of growth, makes possible successive cultivation and growth reproduction, and makes practical the industrial tank culture method.

(2) *Method of cultivation.*—The selected strain mentioned above was inoculated in a conventional medium of inorganic salts added with amino acids, the maximum amount of sugars or organic acids capable of being used and a nitrogen source to make C/N ratio to less than 6. The medium was charged in a fermentation tank generally used in common fermentation industries and cultivated at 30° C. with aeration and stirring without special supply of light. When the maximum growth of Chlorella reached, the medium was scaled up to the tenfold larger medium step by step, and finally it was purely cultured in a tank of several tons and taken out.

(3) Comparison between heterotrophic tank culture of this invention and the conventional pond culture indicates remarkable advantages of the present invention as shown below.

(a) As for the rate of growth, the method of this invention gives a yield 16 g./l. day, while the pond culture gives a yield of only 0.086 g./l. day, and so the former yield is about 200 times greater than the latter. Moreover, the protein content of the algae produced is unchanged and the content of vitamin B complex is especially larger in the method of this invention.

(b) From the standpoint of industrial production, the method of this invention can make a high rate of utilization of substrates when conducted under a perfect production control and permits easy harvesting and good sanitary conditions. In addition, the installation for its production and the cost of production is very inexpensive. In the method of pond-culture, on the contrary, wild germs contaminate abundantly, the quality of the product shows variation, the rate of utilization of substrates is low, and the weather is predominant, thus rendering this method unsuitable for industrial application.

(c) Selection and separation of heterotrophic strains is facilitated in a short time by the addition of amino acids, and these strains display very large multiplication which is reproducible.

Examples of the present invention are given hereinafter.

*Example 1*

A medium was prepared as follows:

|  | G./l. |
|---|---|
| $KNO_3$ | 1.25 |
| $MgSO_4 \cdot 7H_2O$ | 1.25 |
| $KH_2PO_4$ | 1.25 |
| Fe-solution [1] and modified $A_5$ [2] solution, 1 ml., each. | |
| Glucose | 10.0 |
| Casamino acids | 5.0 |

(pH was adjusted to 6.0.)

[1] Fe-solution:
| | |
|---|---|
| $FeSO_4 \cdot 7H_2O$ | g./l.__ 2.0 |
| Conc. $H_2SO_4$ | drops/l.__ 4 |

[2] Modified $A_5$ solution:
| | G./l. |
|---|---|
| $H_3BO_3$ | 2.86 |
| $MnCl_2 \cdot 4H_2O$ | 1.81 |
| $ZnSO_4 \cdot 7H_2O$ | 0.222 |
| $MoO_3$ | 0.0177 |
| $CuSO_4 \cdot 5H_2O$ | 0.079 |
| $CoCl_2$ | 1.00 |

The medium of above composition was taken in a flask capped with cotton, sterilized by heating under pressure, inoculated respectively with a number of Chlorella strains previously isolated in a pure culture and cultivated autotrophically on an agar medium of inorganic salts with shaking at 30° C. in the dark. A strain that has grown most actively after six days was taken as the seed for the subsequent culture, and the above-said procedure was repeated more than 3 times, the culture obtained being used as the seed culture.

Then a medium was prepared by using the following components:

| | |
|---|---|
| $KNO_3$ | g./l.__ 5.0 |
| $MgSO_4 \cdot 7H_2O$ | g./l.__ 1.25 |
| $KH_2PO_4$ | g./l.__ 2.00 |
| Fe-solution and modified $A_5$ solution, 5 ml., each. | |
| Glucose | 50 |
| Extract from defatted soy beans | ml.__ 50 |

(pH was adjusted to 6.0.)

The medium was sterilized under pressure, to which the seed culture was inoculated (3 g./l.) and cultivated at 30° C. with shaking, and two days thereafter $KNO_3$ solution (7 g./100 ml., N=400 mg.) previously sterilized was added aseptically to the culture solution, pH being adjusted to 6.0 with conc. $H_2SO_4$, and after further cultivation for two days, the algae were harvested. No special illumination was applied during cultivation. Yield (dry matter): 22.5 g./l.

In case of the industrial production, the culture was scaled up to the ten-fold larger culture medium step by step. Each cultivating tank in this case was equipped with a stirrer, an aeration apparatus, and heat retaining apparatus. The medium of above-said composition was charged in the tank, which was inoculated with the seed culture after sterilization under pressure followed by cooling, and cultivation was proceeded at 30° C. with stirring and introducing aseptic air. The culture was carried out in this schedule thereafter. Each tank was purposely not illuminated with light.

*Example 2*

A culture medium was prepared as follows:

|  | G./l. |
|---|---|
| Urea | 1.00 |
| $MgSO_4 \cdot 7H_2O$ | 0.25 |
| $KH_2PO_4$ | 0.25 |
| KCl | 0.25 |
| Fe-solution and modified $A_5$ solution, 1.0 ml. each. | |
| Glucose | 10.0 |
| Casamino acids | 5.0 |

Into 500 ml. flasks with cotton seal was placed a 100 ml. culture medium of above-mentioned composition, which was then sterilized under a pressure of 15 lbs. for 15 minutes, inoculated with many strains of Scenedesmus having been isolated in a pure culture and previously cultured autotrophically on an agar medium of inorganic salts, and the shaken culture was conducted at 30° C. in the dark.

After six days cultivation, a strain that had grown most actively was seeded to the subsequent culture, and this procedure was repeated more than 3 times to obtain the seed culture.

A culture medium having the following composition was sterilized to which the seed culture was inoculated (3 g./l.),

|  | G./l. |
|---|---|
| Urea | 2.0 |
| $MgSO_4 \cdot 7H_2O$ | 2.0 |
| $KH_2PO_4$ | 3.0 |
| KCl | 0.25 |
| Fe-solution and modified $A_5$ solution, 5.0 ml. each. | |
| Glucose | 50.0 |
| Waste liquor from fermented milk, 50 ml., (N=400 mg.). | |

(pH was adjusted to 6.0.)

cultivated at 30° C. with shaking for 36 hours, and to which an urea solution (urea 3 g./50 ml.) previously prepared and sterilized was added aseptically to the culture, cultivated for further 12 hours continuously and then harvested. Yield (dried matter): 32.5 g./l.

In case of large scale cultivation for industrial production, the amount should be increased successively as in case of large scale cultivation of Example 1.

At the stage of final culture (4000 l.), an urea solution (12 kg. of urea dissolved in water of 40 l.) previously prepared anew and sterilized was added to the culture broth aseptically after about 36 hours from the initiation of cultivation, and the algae were harvested after further cultivation was carried out for 12 hours. Yield: 120 kg./4 t.

What we claim is:

A method for the industrial cultivation of unicellular green algae which comprises (a) inoculating unicellular green algae from the group of Chlorella and Scenedesmus to a sterilized medium comprising (1) a carbon source selected from the group of sugars and organic acids, (2) a nitrogen source, (3) inorganic salts, and (4) at least one amino acid selected from the group of cystine, cysteine, methionine, serine, glycine, lysine, tryptophane and natural materials containing the said amino acids, (b) cultivating for several days with shaking or stirring under aeration in the dark at optimum temperatures in the absence of externally introduced carbon dioxide, (c) selectively isolating strains showing the greatest multiplication, (d) repeating the cultivation of the selected strains in the manner previously conducted to select a strain showing the largest multiplication as the seed strain, (e) inoculating the said strain to a culture medium having the previously indicated composition, and (f) cultivating aseptically at suitable temperatures with shaking or stirring under aeration in the absence of light and in the absence of externally introduced carbon dioxide.

References Cited by the Examiner

UNITED STATES PATENTS 2,949,700   8/1960   Kathrein _____ 47—1.4

ABRAHAM G. STONE, *Primary Examiner.*

R. E. BAGWILL, *Assistant Examiner.*